US009683717B1

(12) United States Patent
Householder

(10) Patent No.: US 9,683,717 B1
(45) Date of Patent: Jun. 20, 2017

(54) ASYMMETRIC AREA LENS FOR LOW-PROFILE LIGHTING SYSTEM

(71) Applicant: Universal Lighting Technologies, Inc., Madison, AL (US)

(72) Inventor: John R. Householder, Cedar Park, TX (US)

(73) Assignee: UNIVERSAL LIGHTING TECHNOLOGIES, INC., Madison, AL (US)

( * ) Notice: Subject to any disclaimer, the term of this patent is extended or adjusted under 35 U.S.C. 154(b) by 244 days.

(21) Appl. No.: 14/701,138

(22) Filed: Apr. 30, 2015

Related U.S. Application Data

(60) Provisional application No. 61/991,905, filed on May 12, 2014.

(51) Int. Cl.

| | |
|---|---|
| ***F21V 5/04*** | (2006.01) |
| ***B29D 11/00*** | (2006.01) |
| ***F21V 5/08*** | (2006.01) |
| ***F21V 5/00*** | (2015.01) |
| ***F21K 99/00*** | (2016.01) |
| *F21Y 103/00* | (2016.01) |

(52) U.S. Cl.
CPC .................. *F21V 5/08* (2013.01); *F21K 9/50* (2013.01); *F21V 5/008* (2013.01); *F21V 5/045* (2013.01); *F21Y 2103/003* (2013.01)

(58) Field of Classification Search
CPC ............... F21V 5/08; F21V 5/008; F21K 9/50
See application file for complete search history.

(56) References Cited

U.S. PATENT DOCUMENTS

| | | | | |
|---|---|---|---|---|
| 6,257,737 | B1 | 7/2001 | Marshall et al. | |
| 7,559,672 | B1 | 7/2009 | Parkyn et al. | |
| 7,574,822 | B1 | 8/2009 | Moore | |
| 7,837,370 | B2 | 11/2010 | Bierhuizen et al. | |
| 2011/0141734 | A1* | 6/2011 | Li | F21V 5/04 362/235 |
| 2012/0307503 | A1* | 12/2012 | Wilcox | F21V 5/008 362/308 |
| 2014/0268810 | A1* | 9/2014 | Marquardt | F21V 7/22 362/308 |
| 2014/0293614 | A1* | 10/2014 | Wang He | F21V 5/04 362/311.02 |
| 2015/0204508 | A1* | 7/2015 | Kim | F21V 5/04 362/311.06 |

* cited by examiner

*Primary Examiner* — Elmito Breval
(74) *Attorney, Agent, or Firm* — Patterson Intellectual Property Law, PC; Mark J. Patterson; Jerry Turner Sewell

(57) ABSTRACT

A low-profile lighting system includes an asymmetric area lens having a "batwing" configuration that receives light from at least one light-emitting diode (LED) that emits light having a Lambertian light distribution pattern. The asymmetric lens refracts the light to generate a modified light distribution pattern having light distributed in a selected range of angles. A first portion of the output surface of the asymmetric lens refracts light angularly away from a reference plane. A second portion of the output surface of the symmetric lens refracts light angularly toward the reference plane. The refracted light from the asymmetric lens is provided to a dispersion lens. The dispersion lens produces a dispersed light distribution pattern that illuminates an illumination area. In certain embodiments, the lens has a profile formed by an outer curve having the general shape of an Archimedean spiral or an involute curve.

31 Claims, 10 Drawing Sheets

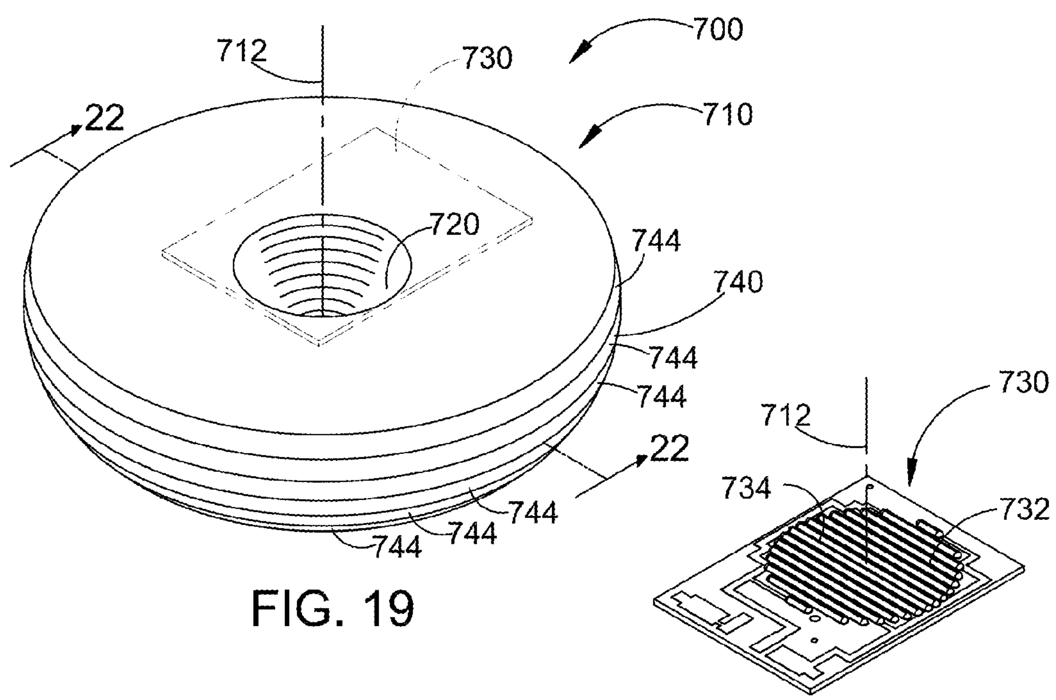
FIG. 19
FIG. 20
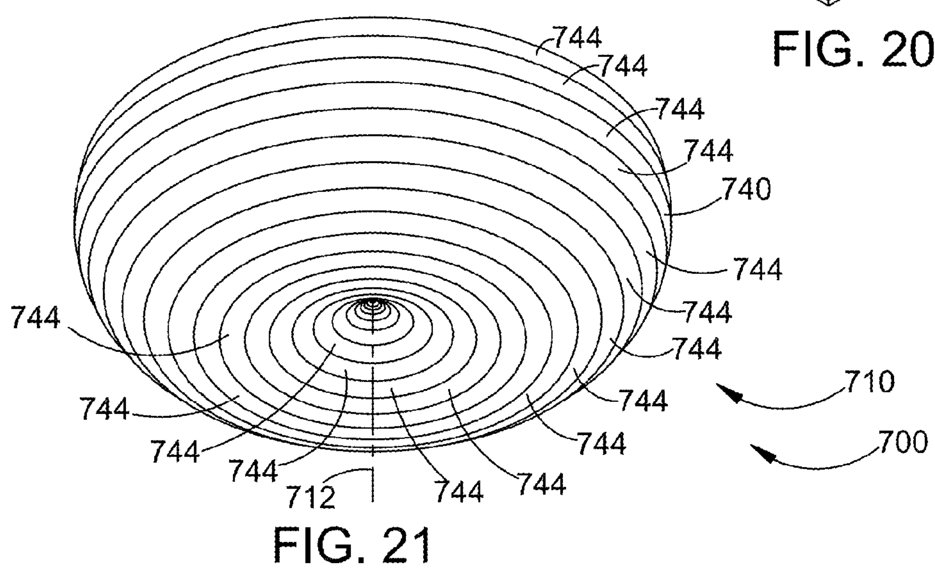
FIG. 21
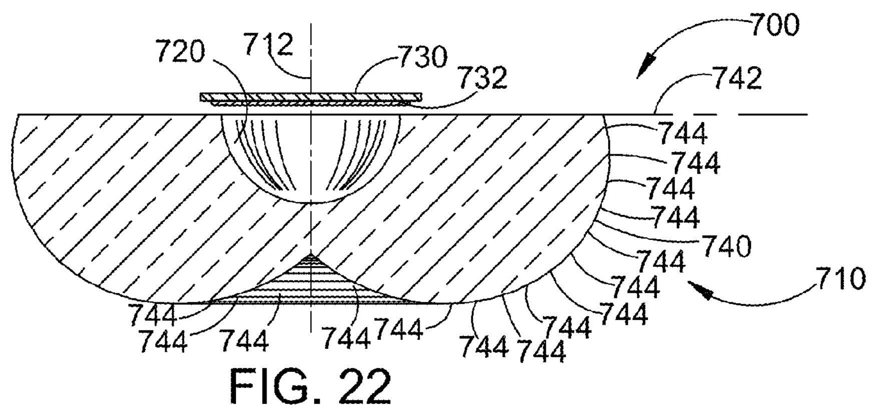
FIG. 22

ASYMMETRIC AREA LENS FOR LOW-PROFILE LIGHTING SYSTEM

RELATED APPLICATIONS

The present application claims the benefit of priority under 35 USC §119(e) to U.S. Provisional Application No. 61/991,905, filed on May 12, 2014, which is incorporated by reference herein.

BACKGROUND OF THE INVENTION

Field of the Invention

The description and claims in this application are related to a low-profile lighting system to provide uniform illumination for a target area.

Description of the Related Art

Lighting systems based on light-emitting diodes (LEDs) are replacing conventional incandescent lights and fluorescent lights in many locations. Recently, linear lighting fixtures based on a plurality of lineally aligned LEDs are starting to replace fluorescent tubes for overhead fixtures. Unlike fluorescent tubes, which generally emit light uniformly about a cylinder, the LEDs of a linear lighting fixture are generally directional light sources that produce light over a relatively narrow range of angles rather than over a broad area. Thus, LED-based fixtures include additional components to redirect and diffuse the light to provide more uniform lighting. The additional components tend to be large and add considerable size and weight to what would otherwise be a small light fixture.

SUMMARY OF THE INVENTION

A need continues to exist for improvements in the redirection and diffusion of light generated by LED-based fixtures. Embodiments disclosed herein use a primary lens redirector over a plurality of LEDs to spread light uniformly onto a secondary diffusing surface having a low profile to provide an improved lighted appearance and uniform target illumination.

An aspect of an embodiment disclosed herein is a low-profile lighting system that includes an asymmetric area lens having a "batwing" configuration. The lens receives light from at least one light-emitting diode (LED) that emits light having a Lambertian light distribution pattern. The asymmetric lens refracts the light to generate a modified light distribution pattern having light distributed in a selected range of angles. A first portion of the output surface of the asymmetric lens refracts light angularly away from a reference plane. A second portion of the output surface of the symmetric lens refracts light angularly toward the reference plane. The refracted light from the asymmetric lens is provided to a dispersion lens. The dispersion lens produces a dispersed light distribution pattern that illuminates an illumination area. In certain embodiments, the lens has a profile formed by an outer curve having the general shape of an Archimedean spiral or an involute curve.

Another aspect of an embodiment disclosed herein is a low-profile lighting apparatus that comprises at least one light-emitting diode (LED). A primary optical lens is positioned with respect to the LED. The primary optical lens comprises at least one lobe defined with respect to a lens reference plane, with respect to a lens center point in the lens reference plane, and with respect to a lens optical axis. The lens optical axis is orthogonal to the lens reference plane and passes through the lens center point. The at least one lobe comprises a primary lens input surface displaced from the lens center point to receive light emitted by the LED. The primary lens input surface has a semicircular profile defined with respect to the lens center point. A primary lens output surface is displaced from the primary lens input surface to define a primary lens body between the input surface and the output surface. The primary lens output surface has a cross-sectional profile defined with respect to the lens reference plane and the lens optical axis. The cross-sectional profile of the output surface comprises at least a first curve segment angularly closest to the lens reference line. The first curve segment has a first slope that slopes away from the lens reference line and away from the lens optical axis. The profile of the output surface comprises at least a second curve segment which is angularly farther from the lens reference line than the first curve segment. The second curve segment has a second slope that slopes away from the lens reference line. The second slope is steeper than the first slope. The profile of the output surface also comprises at least a third curve segment which is angularly farther from the lens reference line than the second curve segment. The third curve segment has a third slope that is less steep than the second slope. The third curve segment has a third slope that slopes away from the lens reference line and toward the lens optical axis. The profile of the output surface also comprises a first plurality of additional curve segments which are progressively angularly farther from the lens reference line than the third curve segment. Each of the first plurality of additional curve segments slopes away from the lens reference line and slopes toward the lens optical axis, with each successive curve segment having a slope that is less steep than the immediately preceding curve segment. The profile of the output surface also comprises a second plurality of additional curve segments which are progressively angularly farther from the lens reference line than the first plurality of additional curve segments. The second plurality of additional line segments slopes toward the lens reference line and slopes towards the lens optical axis, with each successive curve segment in the second plurality of additional curve segments having a steeper slope than the immediately preceding curve segment.

In certain embodiments, the cross-sectional profile of the output surface further includes a third plurality of additional curve segments which are progressively angularly farther from the lens reference line than the second plurality of additional curve segments. The third plurality of additional curve segments slope toward the lens reference line and slope towards the lens optical axis, with each successive curve segment in the third plurality of additional curve segments having a less steep slope than the immediately preceding curve segment.

In certain embodiments, each curve segment is substantially straight. In certain embodiments, the curve segments have the appearance of an arcuate segment of a faceted Archimedean spiral. In certain embodiments, the curve segments have the appearance of an arcuate segment of a faceted involute curve.

In certain embodiments, each curve segment is an arcuate segment of a spline curve. In certain embodiments, the spline curve has the appearance of an arcuate segment of an Archimedean spiral. In certain embodiments, the spline curve has the appearance of an arcuate segment of an involute curve.

In certain embodiments, the at least one lobe is a first lobe, and the primary optical lens further comprises a second lobe. The second lobe has a cross-sectional profile symmetrical with the cross-sectional profile of the first lobe about the lens optical axis. The first and second lobes extend along a longitudinal axis. In certain embodiments, the symmetrical profiles of the outer surfaces of the two lobes have a "batwing" appearance.

In certain embodiments, the at least one lobe is rotated about the lens optical axis such that the primary optical lens is rotationally symmetric about the lens optical axis.

In certain embodiments, the curve segments are grouped in a plurality of Fresnel facets to reduce the overall thickness of the primary optical lens.

Another aspect of an embodiment disclosed herein is a low-profile lighting apparatus that comprises at least one light-emitting diode (LED). A primary optical lens is positioned with respect to the LED. The primary optical lens comprises at least one lobe defined with respect to a lens reference plane, with respect to a lens center point in the lens reference plane, and with respect to a lens optical axis orthogonal to the lens reference plane. The lens optical axis passes through the lens center point. The at least one lobe comprises a primary lens input surface displaced from the lens center point to receive light emitted by the LED. The primary lens input surface has a semicircular profile defined with respect to the lens center point. A primary lens output surface is displaced from the primary lens input surface to define a primary lens body between the input surface and the output surface. The primary lens output surface has a cross-sectional profile defined with respect to the lens reference plane and the lens optical axis. The cross-sectional profile of the output surface comprises a plurality of interconnected points positioned angularly with respect to the lens reference plane and spaced apart from the center point by distances that vary in accordance with the angular positions of the points with respect to the lens reference plane. A first point is located at a first angular position with respect to the lens reference plane and is located a first linear distance from the center point. At least a second point is located at a second angular position with respect to the lens reference plane. The second angular position is greater than the first angular position. The second point is located at a second linear distance from the center point, and the second linear distance greater than the first linear distance. At least a third point is located at a third angular position with respect to the lens reference plane. The third angular position is greater than the second angular position. The third point is located at a third linear distance from the center point, and the third linear distance less than the second linear distance. A last point is located on the lens optical axis and is located a shortest linear distance from the center point. The shortest linear distance is less than the third linear distance. Any points between the third point and the last point are located at increasing angular distances from the lens reference plane and are located at decreasing linear distances from the center point.

In certain embodiments, the at least one LED comprises a plurality of light-emitting diodes (LEDs) arranged in a linear array along a longitudinal array axis; and the profile of the input surface and the profile of the output surface of the primary optical lens extend longitudinally along the longitudinal array axis to position the input surface over the LEDs in the linear array.

In certain embodiments, the primary optical lens extends longitudinally along a lens axis; the body of the primary optical lens between the lens reference plane and the lens optical axis comprises a first lobe positioned on a first side of the lens optical axis; and the body of the primary optical lens further includes a second lobe positioned on a second side of the lens optical axis, the second lobe and the first lobe being symmetrical with respect to the lens optical axis.

In certain embodiments, the profile of the first lobe and the profile of the second lobe together have a batwing-like shape.

In certain embodiments, the lens reference plane extends longitudinally in parallel with the longitudinal array axis; the lens optical axis lies in a second reference plane orthogonal to the lens reference plane, the second reference plane extending longitudinally along the longitudinal array axis; and light emitted by the LEDs enters the at least one lobe of the primary optical lens via the input surface and is refracted from the outer surface at a plurality of angles between the lens reference plane and the second reference plane such that the light is concentrated at angles in a range of approximately 15 degrees from the second reference plane to approximately 40 degrees from the second reference plane.

In certain embodiments, the profile of the outer surface of the primary optical lens has an appearance similar to a portion of an Archimedean curve.

In certain embodiments, the profile of the outer surface of the primary optical lens has an appearance similar to a portion of an involute curve.

In certain embodiments, the at least one LED comprises a single LED having an emission surface positioned close to the center point of the primary optical lens; and the profile of the input surface and the profile of the output surface of the primary optical lens are rotated about the lens optical axis to form a rotationally symmetric lens body about the lens optical axis.

In certain embodiments, light emitted by the LED enters the primary optical lens via the input surface and is refracted from the outer surface at a plurality of angles between the lens reference plane and the lens optical axis, such that the light is concentrated at angles in a range of approximately 15 degrees from the second reference line to approximately 40 degrees from the lens optical axis, the light being concentrated rotationally symmetrically about the lens optical axis.

In certain embodiments, the plurality of interconnected points are interconnected by a spline curve to provide a smooth outer surface of the primary optical lens having a continually varying distance from the center point.

In certain embodiments, the points in each adjacent pair of the plurality of interconnected points are interconnected by a facet.

In certain embodiments, the lighting apparatus further comprises a diffuser lens displaced from the primary optical lens to receive light from the output surface of the primary optical lens and to diffuse the received light.

Another aspect in accordance with the embodiments disclosed herein is a low-profile lighting apparatus that comprises at least one light-emitting diode (LED). The lighting apparatus further comprises a primary optical lens positioned with respect to the LED, the primary optical lens having at least one lobe between a lens reference plane and a lens optical axis, the lens optical axis passing through a lens center point lying in the lens reference plane. The at least one lobe comprises a primary lens input surface displaced from the lens center point to receive light emitted by the LED. The primary lens input surface has a semicircular profile defined with respect to the lens center point. The at least one lobe further comprises a primary lens output surface displaced from the primary lens input surface to define a primary lens body between the input surface and the output surface. The primary lens output surface has a cross-sectional profile defined by a plurality of interconnected points to provide a continuous outer surface. The interconnected points are displaced from the lens center point by varying distances and are positioned at varying angles with respect to the lens reference plane. The interconnected points comprise a first set of points along a first portion of the output surface from the lens reference plane to a first boundary angle. The points in the first portion are positioned at increasing distance from the lens center point as the angles with respect to the lens referenced plane increase. The interconnected points comprise a second set of points along a second portion of the output surface from the boundary angle to the lens optical axis. The points in the second portion are positioned at decreasing distances from the lens center point as the angles with respect to the lens referenced plane increase.

In certain embodiments, the at least one lobe is a first lobe, and the primary optical lens further comprises a second lobe. The second lobe has a cross-sectional profile symmetrical with the cross-sectional profile of the first lobe about the lens optical axis. The first and second lobes extend along a longitudinal axis.

In certain embodiments, the at least one lobe is rotated about the lens optical axis such that the primary optical lens is rotationally symmetric about the lens optical axis.

In certain embodiments, the plurality of interconnected points are interconnected by a spline curve to provide a smooth outer surface of the primary optical lens having a continually varying distance from the center point.

In certain embodiments, the points in each adjacent pair of the plurality of interconnected points are interconnected by a facet.

In certain embodiments, the profile of the outer surface of the primary optical lens has an appearance similar to a portion of an Archimedean curve.

In certain embodiments, the profile of the outer surface of the primary optical lens has an appearance similar to a portion of an involute curve.

BRIEF DESCRIPTION OF THE DRAWINGS

The foregoing aspects and other aspects of this disclosure are described in detail below in connection with the accompanying drawing figures in which:

FIG. 19 illustrates an upper perspective view of the primary optical lens of FIG. 18 showing the LED module in phantom over the hemispherical input surface of the primary optical lens;

FIG. 20 illustrates a bottom perspective view of the LED module of FIGS. 18 and 19 showing the generally round light emission portion of the LED;

FIG. 21 illustrates a lower perspective view of the primary optical lens of FIG. 19;

FIG. 22 illustrates a cross-sectional view of the primary optical lens of FIG. 19 taken along the section line 22--22 in FIG. 19.

DETAILED DESCRIPTION OF PREFERRED EMBODIMENTS

A low-profile lighting fixture has a plurality of light-emitting diodes (LEDs) aligned with respect to a common primary redirecting optic to provide uniform lighting to a diffuser. The embodiments are disclosed for illustration of the fixture and are not limiting except as defined in the appended claims.

Figure 1:
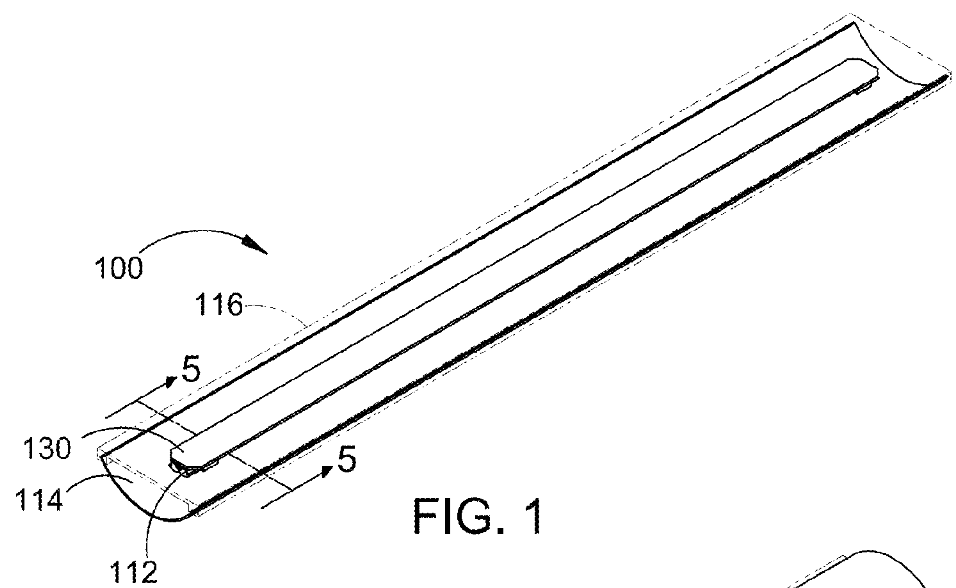
FIG. 1 illustrates a top perspective view of an LED lighting fixture in accordance an embodiment disclosed herein.
Figure 2:
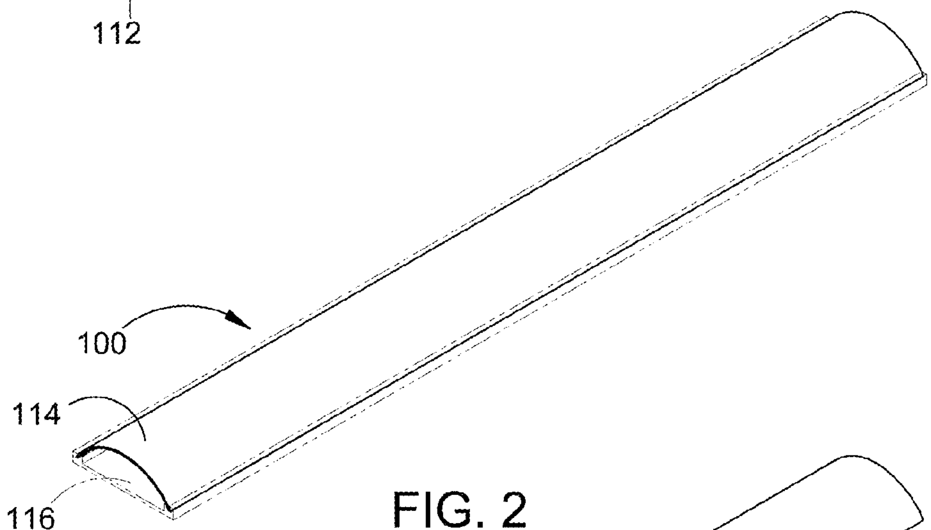
FIG. 2 illustrates a bottom perspective view of the lighting fixture of FIG. 1.
Figure 3:
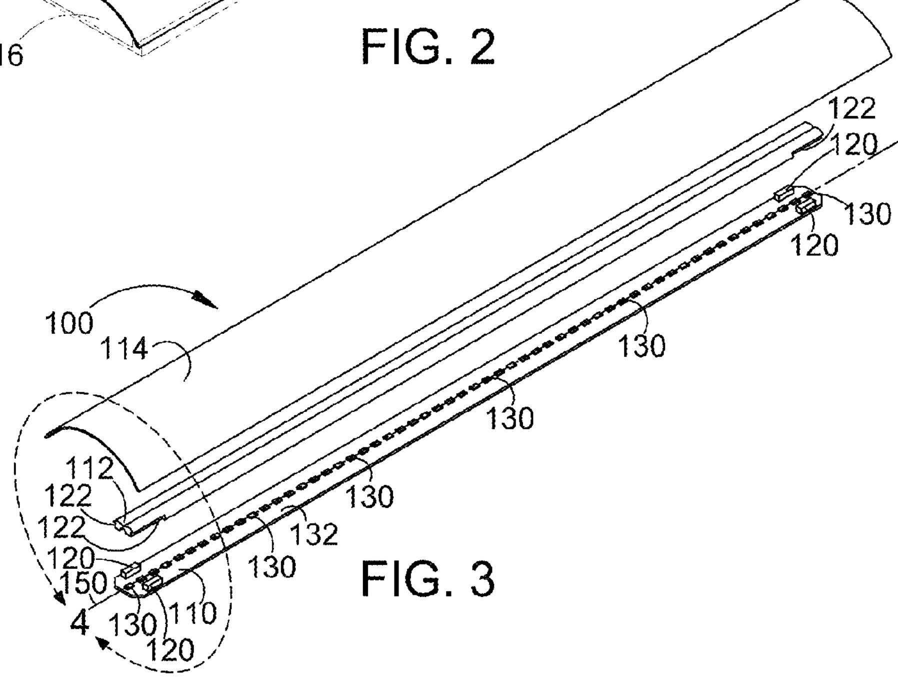
FIG. 3 illustrates an exploded bottom perspective view of the LED lighting fixture of FIG. 1 showing the base module that supports a plurality of aligned LEDs, the primary optic lens positioned over the aligned LEDs, and the diffuser lens positioned with respect to the primary optic lens.
Figure 4:
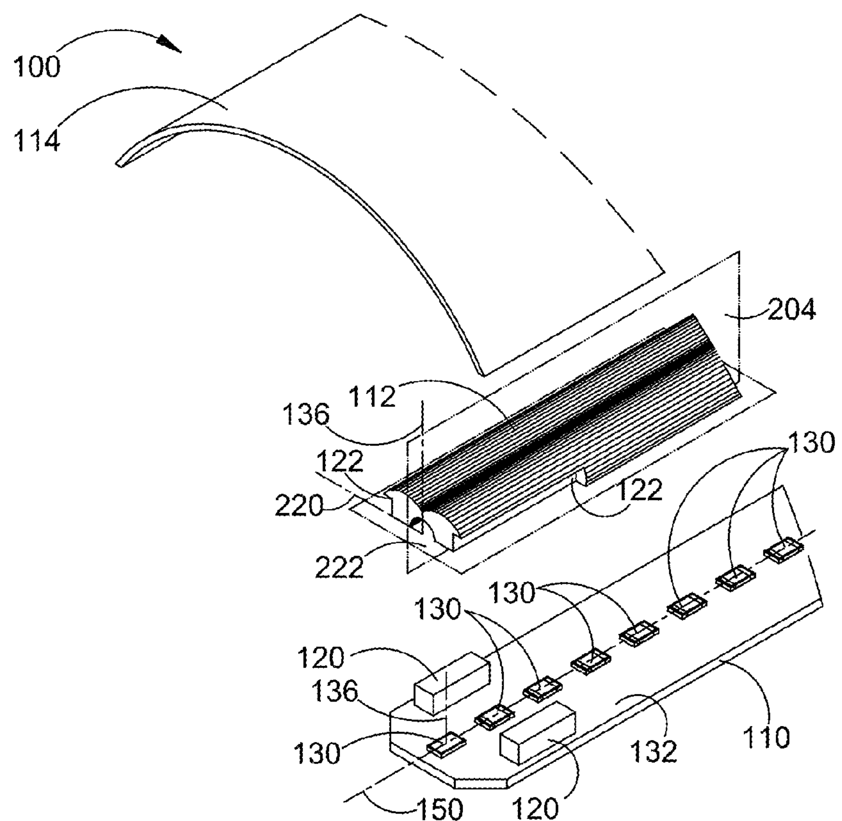
FIG. 4 illustrates an enlarged exploded perspective view of the LED lighting fixture of FIG. 3 taken within the area --4-- in FIG. 3.
Figure 5:
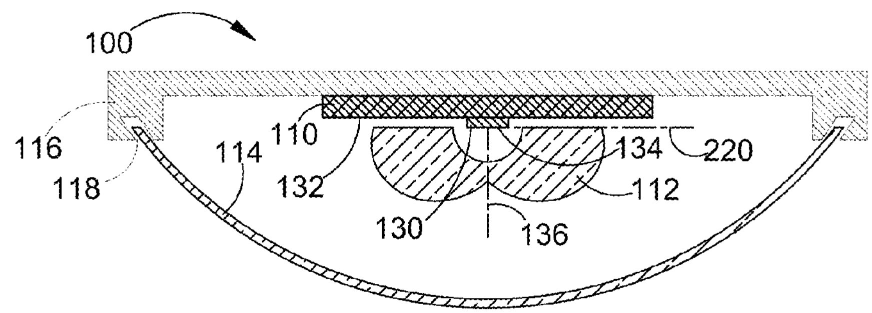
FIG. 5 illustrates a cross-sectional view taken along the line 5--5 in FIG. 1 to show the positions of the primary optic and the diffuser lens with respect to the LEDs.
Figure 6:
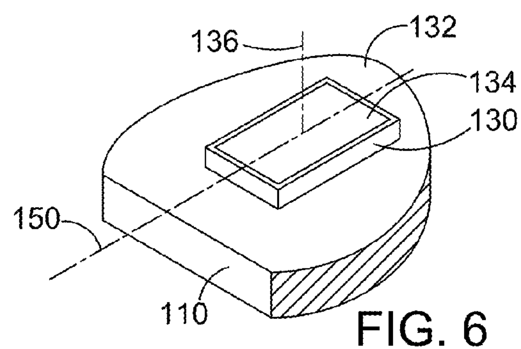
FIG. 6 illustrates an enlarged perspective view of one of the LEDs in FIGS. 3 and 4.

FIGS. 1-6 illustrate the structure of a lighting apparatus 100. FIG. 1 illustrates a perspective top view of the lighting apparatus, which is mountable to a ceiling, a shelf, a cabinet or other suitable structure. FIG. 2 illustrates a perspective bottom view of the lighting apparatus of FIG. 1. FIG. 3 illustrates an exploded perspective view of the lighting apparatus of FIGS. 1 and 2. FIG. 4 illustrates an enlarged exploded perspective view taken within the area --4-- in FIG. 3. FIG. 5 illustrates a cross-sectional view taken along the lines 5--5 in FIG. 1 to show the relative positions of the components of the lighting apparatus. FIG. 6 illustrates an enlarged perspective view of one of the LEDs in FIGS. 3 and 4 to show the emission surface, the normal to the emission surface and a longitudinal axis defined along the bases of the normals to the emission surfaces of the LEDs.

As shown in FIGS. 1-6, the lighting apparatus 100 includes a base module 110, a primary optical lens 112 and a dispersion lens 114. The lighting apparatus is illustrated with only the elements pertinent to the present disclosure. Other elements, such as mounting brackets, wiring components, and the like, are not shown in the drawings. For example, the base module may be mounted directly to a wall, a shelf or other structure, or may be mounted to a fixture supporting device such as a hanging droplight or the like. As illustrated, the dispersion lens is arcuate and is generally centered with respect to the center of the top surfaces of the LEDs (described below). The dispersion lens is retained in the illustrated position relative to the base module and the primary optical lens by suitable mounting structures. For example, the dispersion lens may be secured by engagement devices along the longitudinal edges of the dispersion lens. The base module can be mounted to a fixture base 116 (shown in phantom in the FIGS. 1,2 and 5), and the dispersion lens can be mounted in a pair of longitudinal receiving slots 118 (FIG. 5) formed into the fixture base. Such mounting structures are known in the art.

As shown in FIGS. 3 and 4, the base module 110 includes four electrical connector blocks 120 that are connectable to an electrical power source (not shown) to energize the base module. The optical lens 112 includes a plurality of recesses 122 that are juxtaposed with the connector blocks so that the optical lens can be positioned onto the base module without interfering with the connector blocks or interfering with the wiring connected to the connector blocks. The optical lens can be secured to the base module by screws, clips or other suitable securing devices.

Figure 7:
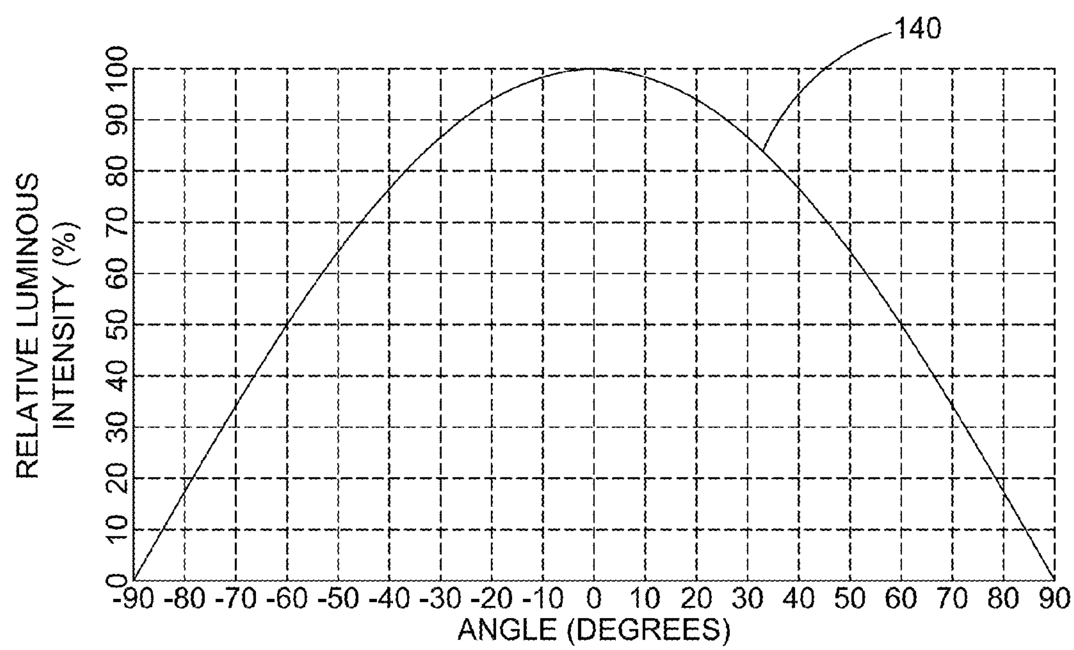
FIG. 7 illustrates a Lambertian distribution pattern for light emitted from the surface of the LED of FIGS. 4 and 5.

As shown in FIG. 2, the base module 110 supports a plurality of light-emitting diodes (LEDs) 130 that are aligned on the surface 132 of the base module. Each LED has a respective planar emission surface 134 (see FIG. 6) displaced from the surface of the base module by the thickness of the LED. In the illustrated embodiment, the emission surfaces are rectangular and have sides with lengths of approximately 2.6 millimeters (approximately 0.1 inch) by 4.6 millimeters (approximately 0.18 inch). Other surface configurations can also be used. The outer dimensions of the LED packages are slightly larger (e.g., approximately 3 millimeters by 5 millimeters). Each emission surface has a respective normal 136 (see FIG. 6) extending perpendicularly from the emission surface. The normal is also referred to herein as the lens optical axis with respect to the underlying LED. In one embodiment, the LEDs advantageously comprise LM561B LED surface mountable chips commercially available from Samsung Electronics. Each LED emits approximately 30 lumens when driven with 65 milliamperes of current. Each LED generates light having a Lambertian luminance distribution with respect to the normal to the emission surface such that the luminance of light emitted normal to the emission surface of the LED is greater than light emitted at other angles with respect to the normal. A typical Lambertian intensity distribution pattern 140 for one of the LEDs is illustrated in FIG. 7. As illustrated the intensity of the light decreases generally in accordance with the cosine of the angle with respect to the normal such that, for example, the light intensity at 10 degrees from normal is approximately 98 percent of the light intensity at the normal, the light intensity at 60 degrees from normal is approximately 50 percent of the light intensity at the normal, and the light intensity at 75 degrees from normal is approximately 20 percent the intensity at the normal.

The LEDs 130 are spaced apart along the surface 132 of the base module 112 by a suitable distance such that the light from adjacent LEDs partly overlaps to provide the effect of continuous light along a longitudinal axis 150 (FIGS. 3, 4 and 6), which is defined to interconnect the intersections of the normals 136 with the respective emission surfaces 134 of the LEDs as shown in the enlarged perspective view in FIG. 4. In the illustrated embodiment, the base module 130 has an overall length of approximately 560 millimeters (approximately 22 inches), and the LEDs are spaced apart (center-to-center) by approximately 10 millimeters (approximately 0.4 inch). Accordingly, in the illustrated embodiment, 56 LEDs are positioned along the surface of the base module. In the illustrated embodiment, the LEDs are positioned such that the longer sides of the emission surface are parallel to the longitudinal axis.

As illustrated by the intensity distribution pattern 140 in FIG. 7, the light intensity is greater at angles close to the normal 136 to the emission surface 134 and decreases as the angle from the normal increases. If the light emitted by the LEDs 130 were to be provided directly as the output of the lighting apparatus 100 as positioned in FIG. 1, the area directly below the lighting apparatus (e.g., the area along a line defined by the extended normals to the emission surfaces of the LEDs) would be brightly lighted and areas to the side of the extended normal would receive decreasingly less light as the distance from the line increased and thus the angles to the normals increased in accordance with the Lambertian distribution described above. The lack of uniformity in lighting would be unacceptable in most instances. As described below, the primary optical lens 112 and the diffuser lens 114 operate in combination to reduce the differences in the luminance over a range of angles with respect to the normal of the LEDs.

Figure 8:
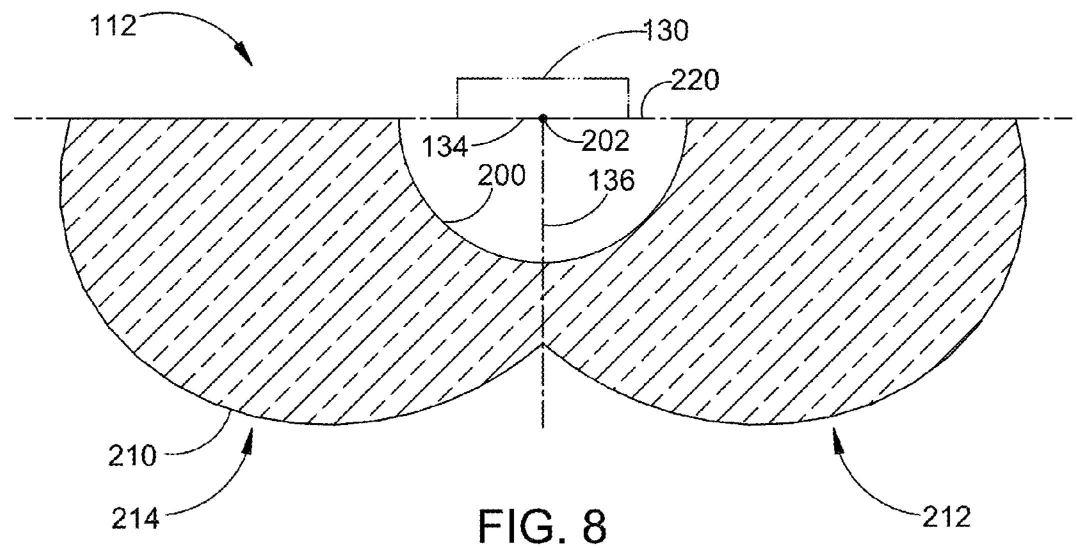
FIG. 8 illustrates an enlarged cross-sectional view of the primary optical lens of FIG. 5 to show additional detail of the lens configuration.

FIG. 8 illustrates an enlarged cross-sectional view of the primary optical lens 112 of FIG. 5 to show additional detail of the lens configuration. The primary optical lens 112 includes an inner surface 200 that defines a hollow semicircle substantially centered about a center point 202. The center point corresponds to the intersection of the normal (lens optical axis) 136 and the planar emission surface 134 of the LED 130. In the illustrated embodiment, the inner surface has a radius of approximately 0.2 inch (approximately 5.1 millimeters). The semicircular inner surface extends linearly with respect to the longitudinal axis 150 (FIGS. 3 and 4) for a distance of approximately 560 millimeters (approximately 22 inches), which corresponds to the length of the base module 110 in the illustrated embodiment. Accordingly, the primary optical lens covers the linear array of LEDs as shown in FIGS. 1-3. The inner surface thus forms a half-cylindrical surface centered with respect to the emission surfaces of the LEDs. The inner surface of the primary optical lens is also referred to herein as the input surface of the primary optical lens. It should be understood that in the linear embodiment of FIGS. 1-6, the lens optical axes of the plurality of LEDs is representative of a lens optical plane 204 (see FIG. 4) that runs the length of the primary optical lens perpendicular to the emission surfaces of the LEDs.

As further shown in FIG. 8, the primary optical lens 112 has a varying thickness from the inner surface 200 to an outer surface 210 such that the outer surface is displaced from the half-cylindrical inner surface by distances that vary with the angle of rotation about the center point 202 of the lens. The outer surface of the primary optical lens is also referred to herein as the output surface of the primary optical lens. In the illustrated embodiment, the outer surface of the lens comprises a first (right) lobe 212 and a second (left) lobe 214 which are mirrored about the normal 136. Each lobe has a substantially similar shape and extends over an angular span of 90 degrees from the normal to a horizontal reference line 220. The horizontal reference line is perpendicular to the normal and lies in a reference plane 222 (see FIG. 9) or parallel to the plane of the emission surface 134 of the LED 130 (shown in phantom in FIG. 8). As illustrated, the each lobe has a first portion proximate to the horizontal reference line that starts with a first thickness and increases in thickness to a selected angular position with respect to the reference line. The lobe then progressively decreases in thickness as the angular position increases until the intersection of the outer surface with the normal. As illustrated, the profile of the outer surface has the general appearance of a portion of an involute curve or a portion of an Archimedean spiral; however, the curve is not referenced to the center point of the lens. Together, the two lobes have an overall appearance that can be referred to as a "batwing."

Figure 9:
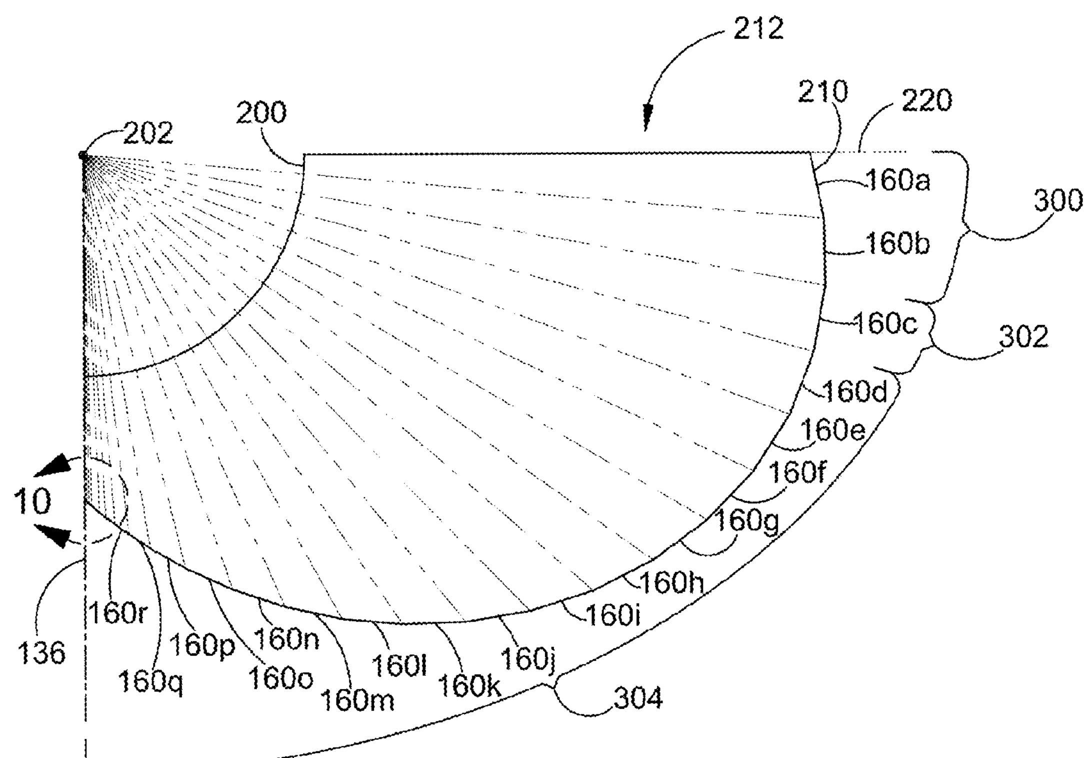
FIG. 9 illustrates a profile of the first (right) lobe of the primary optical lens of FIGS. 5 and 7 to show the facets on the output surface of the lobe.
Figure 10:
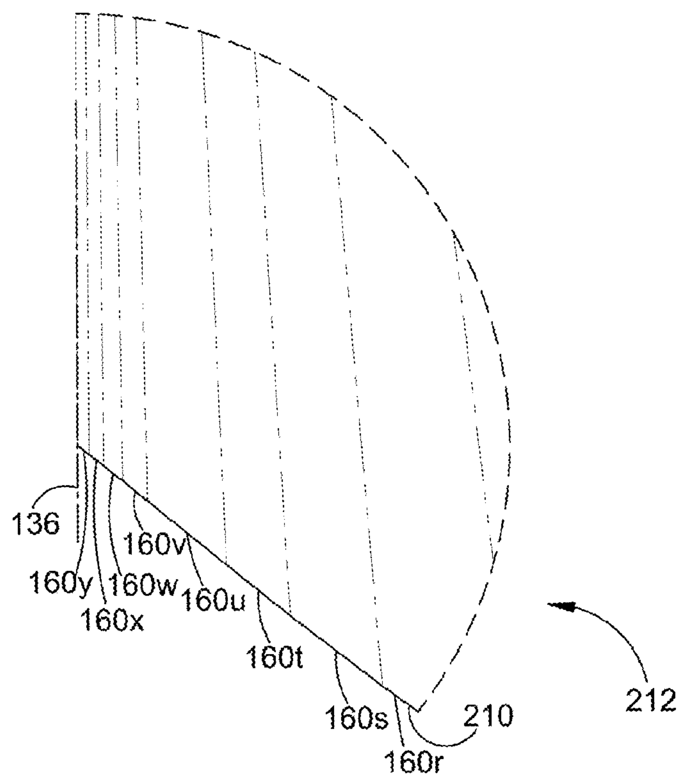
FIG. 10 illustrates an enlarged view of the profile of the first lobe of FIG. 8 taken within the area --10-- of FIG. 9 to identify the narrower facets of the first lobe.

Each lobe 212, 214 of the outer surface 210 of primary optical lens 112 can be configured as a continually varying spline; however, in the illustrated embodiment, the outer surface is configured as a plurality of facets (or lens segments), which are shown in an enlarged view of the first lobe in FIG. 9 and in a further enlarged partial view in FIG. 10. For example, the outer surface in FIGS. 9 and 10 comprises 25 facets 160*a*-160*y*. Each facet has a respective length and angle with respect to the center of the lens in accordance with the respective angular positions of the facets. In FIGS. 9 and 10, each facet is shown as being bounded by a phantom line to assist in illustrating the facets. The facets run the length of the primary optical lens as shown in FIG. 4. Thus, the starting point of each facet in two dimensions in FIG. 8 represents a first edge of the facet running the length of the lens in three dimensions and the ending point of each facet in two dimensions represents a second edge of the facet in three dimensions. It can be seen the profile of the outer surface comprises a plurality of interconnected points with each adjacent pair of the plurality of interconnected points interconnected by one of the facets.

In the illustrated embodiment, each of the facets 160*a*-160*y* of the primary optical lens 112 has respective lengths and angles with respect to the horizontal reference line 220. Each facet has a respective first end and a respect second end wherein the first end is angularly closer to the horizontal reference line. Each end of each facet has a respective radius with respect to the center point 202 of the lens. The facet lengths, the radii of the start and end points and the angles of the radii with respect to the horizontal reference line are shown in the table below. In the table, the lengths of the radii and the lengths of the facets are normalized with respect to the radius of the inner surface 200 set to a value of 1.0. For example, in an embodiment where the inner surface has a radius of 0.2 inch (5.1 millimeters), the length of the radius to the start point of the first facet 160*a* is approximately 0.65704 inch (e.g., 0.2×3.2852). The start angles, end angles and slope angles are in degrees.

TABLE 1

| Facet | Start Radius | End Radius | Start Angle | End Angle | Length | Slope Angle |
|---|---|---|---|---|---|---|
| 160a | 3.2852 | 3.3603 | 0 | 5.09 | 0.3044 | 101.71 |
| 160b | 3.3603 | 3.4059 | 5.09 | 10.18 | 0.3038 | 90.99 |
| 160c | 3.4059 | 3.4200 | 10.18 | 15.27 | 0.3026 | 79.93 |
| 160d | 3.4200 | 3.4021 | 15.27 | 20.35 | 0.3034 | 68.80 |
| 160e | 3.4021 | 3.3491 | 20.35 | 25.44 | 0.3043 | 57.08 |
| 160f | 3.3491 | 3.2669 | 25.44 | 30.53 | 0.3049 | 46.39 |
| 160g | 3.2669 | 3.1597 | 30.53 | 35.62 | 0.3047 | 36.33 |
| 160h | 3.1597 | 3.0318 | 35.62 | 40.71 | 0.3031 | 26.90 |
| 160i | 3.0318 | 2.8856 | 40.71 | 45.80 | 0.3006 | 17.66 |
| 160j | 2.8856 | 2.7284 | 45.80 | 50.88 | 0.2946 | 9.43 |
| 160k | 2.7284 | 2.5654 | 50.88 | 55.97 | 0.2858 | 1.86 |
| 160l | 2.5654 | 2.4010 | 55.97 | 61.06 | 0.2750 | −5.22 |
| 160m | 2.4010 | 2.2369 | 61.06 | 66.15 | 0.2632 | −12.15 |
| 160n | 2.2369 | 2.0770 | 66.15 | 71.24 | 0.2493 | −18.53 |
| 160o | 2.0770 | 1.9242 | 71.24 | 76.33 | 0.2342 | −24.48 |
| 160p | 1.9242 | 1.8035 | 76.33 | 80.55 | 0.1827 | −29.73 |
| 160q | 1.8035 | 1.7265 | 80.55 | 83.36 | 0.1160 | −33.54 |
| 160r | 1.7265 | 1.6760 | 83.36 | 85.29 | 0.0764 | −35.77 |
| 160s | 1.6760 | 1.6412 | 85.29 | 86.65 | 0.0524 | −37.59 |
| 160t | 1.6412 | 1.6166 | 86.65 | 87.62 | 0.0370 | −38.88 |
| 160u | 1.6166 | 1.5865 | 87.62 | 88.85 | 0.0458 | −39.20 |
| 160v | 1.5865 | 1.5773 | 88.85 | 89.25 | 0.0144 | −39.10 |
| 160w | 1.5773 | 1.5703 | 89.25 | 89.56 | 0.0109 | −38.77 |
| 160x | 1.5703 | 1.5651 | 89.56 | 89.80 | 0.0084 | −38.26 |
| 160y | 1.5651 | 1.5611 | 89.80 | 90.00 | 0.0065 | −37.57 |

As illustrated by Table 1, the first facet 160*a* and the second facet 160*b* comprise a first portion of the primary optical lens 112 wherein the thickness of the lens increases with increasing angular distance from the horizontal reference line 220. The third facet 160*c* comprises a second portion of the primary optical lens where the thickness continues to increase; however, the facet is positioned such that the refraction provided by the facet is minimal. The remaining facets 160*d*-160*y* comprise the second portion of the primary optical lens wherein the thickness of the lens decreases with increasing angular distance from the horizontal reference line. The $25^{th}$ facet 160*y* is the boundary of the least thick portion of the lens. The second end of the $25^{th}$ facet is coincident with the normal 136. The starting and ending radii, the starting and ending angles, and the slopes of for each facet are selected to produce the refraction pattern described below.

In Table 1, the first facet 160*a* has a first relatively steep slope, directed down (away from the lens reference line 220) and to the right (away from the lens optical axis 136) in FIG. 9. The second facet 160*b* has a steeper slope, which is almost perpendicular to the lens reference line in FIG. 9. The slope of the third facet 160*c* is less steep slope than the slope of the second facet. The slope of the third facet is oriented opposite the slope of the first facet. The fourth facet 160*d* through the $11^{th}$ facet 106*k* having progressively decreasing slopes. The $12^{th}$ facet 106*l* through the $21^{st}$ facet 106*u* have increasing slopes; however, the slopes are directed up (toward the lens reference line) and to the left (toward the lens optical axis). Thus, the slopes of the $12^{th}$ through $21^{st}$ facets are shown as negative in Table 1. The $22^{nd}$ facet 106*v* through the $25^{th}$ facet 106*y* are generally aligned with the $21^{st}$ facet; however, in the illustrated embodiment, the four facets have slight decreases in the slope with respect to the slopes of lower-numbered facets.

Figure 17:
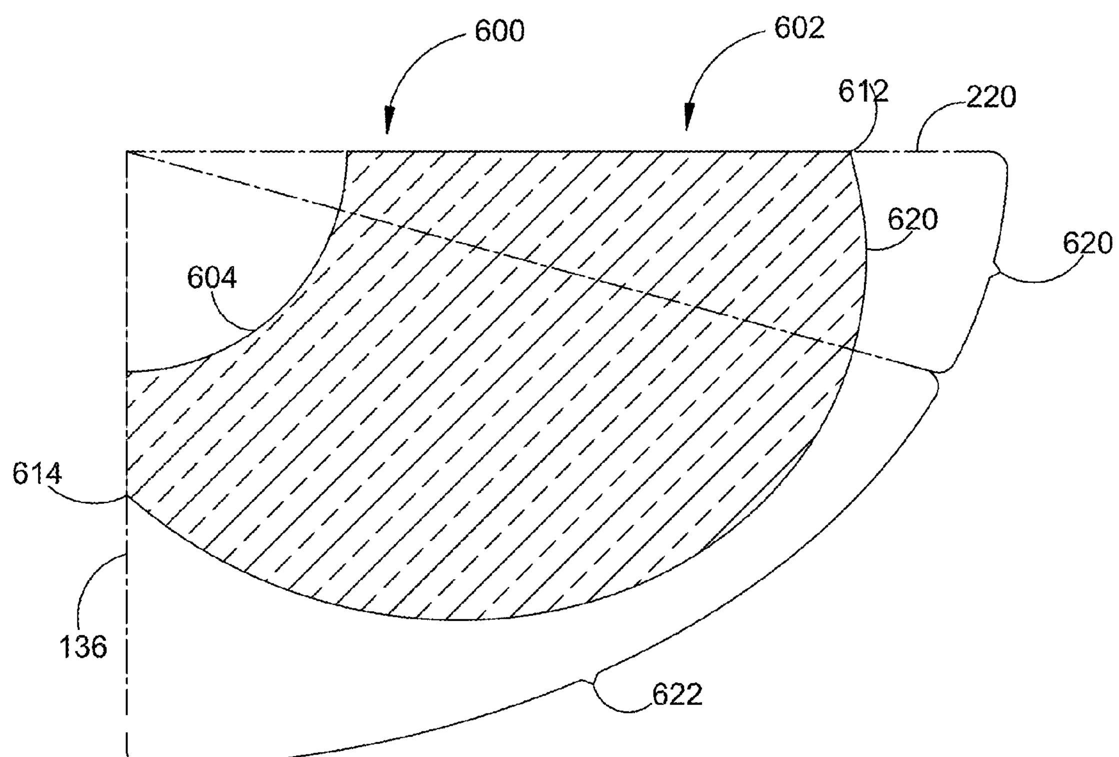
FIG. 17 illustrates a version of the lighting apparatus in which the output surface of the primary optical lens is formed as a continuous curve (e.g., a spline)
Figure 18:
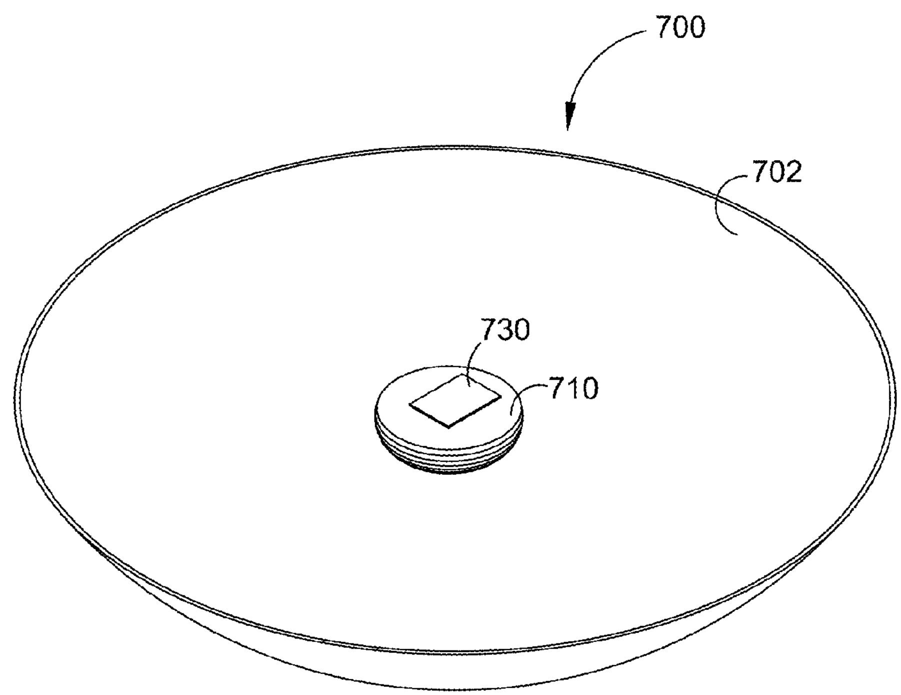
FIG. 18 illustrates an upper perspective view of a version of the lighting apparatus for a single LED, wherein the lighting apparatus includes a diffuser lens and a primary optical lens, which are both rotationally symmetrical about a vertical axis (lens optical axis), and wherein an LED support module is positioned proximate an input side of the primary optical lens.

From the foregoing, it can be seen that the outer surface 210 of the primary optical lens 112 is defined by a plurality of curve segments, which are illustrated as the linear facets 160*a*-160*y* in FIG. 9, and which may be arcuate curve segments as described below in connection with FIG. 17. The outer surface comprises at least a first curve segment (e.g., the segment 106*a* in FIG. 9) angularly closest to the lens reference line 220. The first curve segment has a first slope such the first curve segment slopes away (downwardly when oriented as shown in FIG. 9) from the lens reference line and away (outwardly to the right in FIG. 9) from the lens optical axis 136. The outer surface comprises at least a second curve segment (e.g., the segment 106*b* in FIG. 9), which is angularly farther from the lens reference line than the first curve segment. The second curve segment has a second slope that slopes away from the lens reference line. The second slope is steeper than the first slope. The outer surface comprises at least a third curve segment (e.g., the segment 106*c* in FIG. 9), which is angularly farther from the lens reference line than the second curve segment. The third curve segment has a third slope that is less steep than the second slope. The third curve segment slopes away from the lens reference line and toward (inwardly to the left when oriented as shown in FIG. 9) the lens optical axis. The outer surface comprises a first plurality of additional curve segments (e.g., the segments 106*d*-106*k* in FIG. 9), which are progressively angularly farther from the lens reference line than the third curve segment. The first plurality of additional curve segments also slope away from the lens reference line and slope toward the lens optical axis, with each successive curve segment having a slope that is less steep than the immediately preceding curve segment. The outer surface comprises a second plurality of additional curve segments (e.g., the curve segments 106*l*-106*u* in FIG. 9), which are progressively angularly farther from the lens reference line than the first plurality of additional curve segments. The second plurality of additional line segments slope toward the lens reference line and slope towards (upwardly when oriented as shown in FIG. 9) the lens optical axis. Each successive curve segment in the second plurality of additional curve segments has a steeper slope than the immediately preceding curve segment. In the illustrated embodiment, a third plurality of additional curve segments (e.g., the curve segments 106*v*-106*y*) have slightly decreasing slopes; however, the four segments can also have increasing slopes and be included in the second plurality of additional curve segments.

Figure 11:
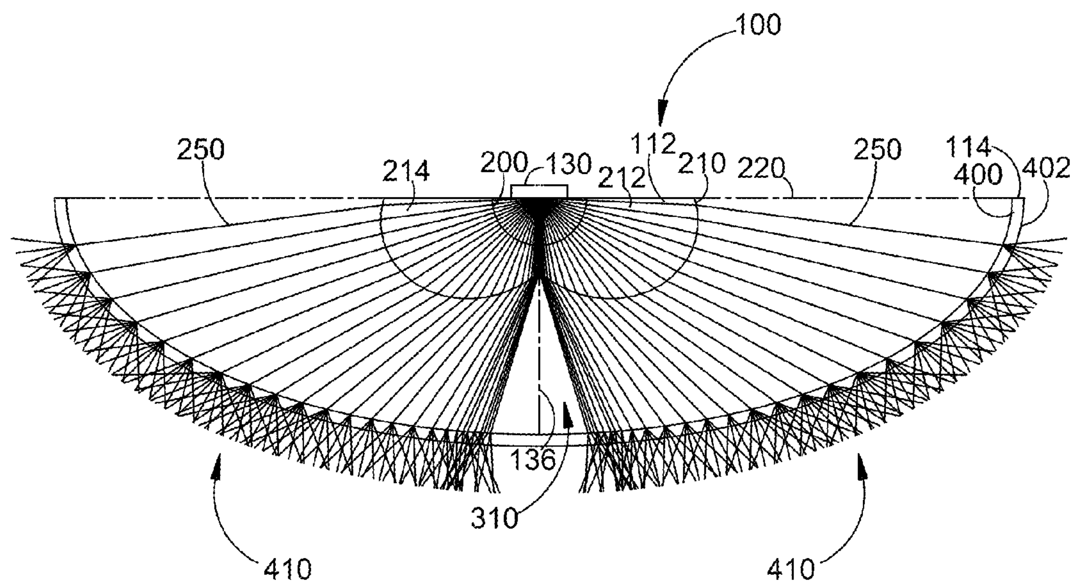
FIG. 11 illustrates the cross-sectional view of FIG. 5 showing a plurality of rays emitted from the center of the emission surface of one of the LEDs at a plurality of angles with respect to the normal and with respect to the horizontal reference line.

FIG. 11 illustrates the cross-sectional view of FIG. 5 showing a plurality of rays 250 emitted from the emission surface 134 of one of the LEDs 130 at a plurality of angles with respect to the normal 136 and with respect to the horizontal reference line 220. Only a few representative rays are shown at various angles incident on the midpoints of the facets 160*a*-160*y* (as identified in FIG. 10). For example, in FIG. 11, all rays appear to be emitted from the center of the LED as if the LED were a point source. The actual distribution includes a continuum of rays at angles with respect to the normal, as discussed below. Also, each ray incident on each of the facets 160*a*-160*y* has a different angle with respect to the normal of the facet in accordance with the angle of the ray with respect to the horizontal reference line. Thus, the rays emanating from each facet will have varying angles in accordance with incident angle of the ray on the inner face of the facet.

The following table summarizes the refractions at the midpoints of each of the facets 160*a*-160*y*:

TABLE 2

| FACET | Incident Angle | Emission Angle | Emission Angle to Lens Optical Axis |
|---|---|---|---|
| 160a | 14.29 | 19.16 | 82.54 |
| 160b | 8.65 | 11.42 | 79.57 |
| 160c | 2.65 | 3.53 | 76.39 |
| 160d | 3.39 | 4.51 | 73.31 |
| 160e | 10.04 | 13.41 | 70.48 |
| 160f | 15.65 | 21.03 | 67.42 |
| 160g | 20.63 | 27.94 | 64.27 |
| 160h | 24.98 | 34.17 | 61.07 |
| 160i | 29.14 | 40.36 | 58.03 |
| 160j | 32.30 | 45.29 | 54.72 |
| 160k | 34.78 | 49.35 | 51.21 |
| 160l | 36.78 | 52.78 | 47.56 |
| 160m | 38.63 | 56.13 | 43.98 |
| 160n | 39.92 | 58.59 | 40.07 |
| 160o | 40.79 | 60.33 | 35.85 |
| 160p | 41.36 | 61.50 | 31.77 |
| 160q | 41.61 | 62.03 | 28.49 |
| 160r | 41.45 | 61.69 | 25.92 |
| 160s | 41.62 | 62.05 | 24.46 |
| 160t | 41.74 | 62.31 | 23.43 |
| 160u | 40.96 | 60.68 | 21.47 |
| 160v | 40.04 | 58.83 | 19.73 |
| 160w | 39.35 | 57.49 | 18.72 |
| 160x | 38.57 | 56.02 | 17.76 |
| 160y | 37.67 | 54.37 | 16.79 |

As illustrated in Table 2, the rays incident on the facets are refracted at various angles with respect to the normal of the facet. In the table, the incident angle is the angle of the ray incident to the midpoint of the facet with respect to the normal of the facet at the midpoint; and the emission angle is the angle of the refracted ray emitted from the surface of the facet at the midpoint with respect to the normal of the facet at the midpoint. The angle to the lens optical axis is the angle of the emitted ray with respect to the lens optical axis 136 described above. The angles of the facets with respect to the lens optical axis 136, as determined by the starting and ending radii, the starting and ending angles, and the lengths of the facets, are selected so that the rays are refracted and emitted in a range of emission angles with respect to the lens optical axis between about 83 degrees and about 16 degrees. Because the facets are straight, the rays incident on either side of the midpoint of a facet will having varying angles of incidence with respect to the local normals where the rays intersect the facet. Thus, the emission angles for each facet will vary about the emission angle for the ray incident on the midpoint. At some locations, the emission angles of rays near the endpoints of adjacent facets will cross, thus providing additional spreading of the emitted light rays.

As shown in FIG. 11, the shape of the profile of the primary optical lens 112 is selected to refract light away from the horizontal plane corresponding to the horizontal reference line 220 and away from the vertical normal 136. In particular, a first portion 300 (see FIG. 9) of the optical lens from the horizontal plane to approximately −10.2 degrees (e.g., in the clockwise direction in FIG. 11) with respect to the center point 202 of the lens encompasses the first two facets 160*a*, 160*b*. The first two facets have starting and ending radii of increasing length to cause the respective facets to be oriented with respect to the incident rays to refract the light emerging from the outer surface 210 of the lens downward (as oriented in FIGS. 8 and 10) away from the horizontal plane. Using conventional angular notation, the first two facets refract the rays in a positive (counter-clockwise) angular direction. A second portion 302 (see FIG.

8) of the optical lens from approximately −10.1 degrees to approximately −15.3 degrees encompasses the third facet 160*c*, which generally passes the light without significant refraction. A third portion 304 (see FIG. 8) of the optical lens from approximately −15.3 degrees to approximately −90 degrees comprises the facets 160*d*-160*y*. The facets in the third portion have starting and ending radii of decreasing normalized lengths such the facets are angled increasingly further in the clockwise direction to cause the facets to refract light in the counterclockwise direction. As illustrated in FIG. 10, for the idealized light rays from a point source, the positioning and orientations of the facets creates a non-emission window 310 directly below the normal which has very little light emerging from the outer surface of the optical lens 112. In the illustrated embodiment, the non-emission window has an angular width of approximately 15 degrees with respect to each side of the normal. The angle is measured with respect to the intersection of the normal with the outer surface of the optical lens. As discussed below, the non-emission window is not entirely devoid of light because the emission surface of the LED is not a point source.

The refraction of the light rays can be adjusted by changing the angles of the facets 160*a*-160*y*. For example, the first two facets 160*a*, 160*b* can be oriented at greater angles with respect to the incident rays in order to refract the rays at greater angles from the horizontal reference line 220. As a further example, the third facet 160*c* can also be oriented to refract light away from the horizontal reference line.

The combination of the non-emission window 310 and the intensity distribution pattern 140 (FIG. 7), the emission of light is concentrated primarily in an emission window 182 that extends from about 15 degrees clockwise from the normal 136 to about 40 degrees clockwise from the normal with respect to the center point 202 of the primary optical lens 112.

Figure 12:
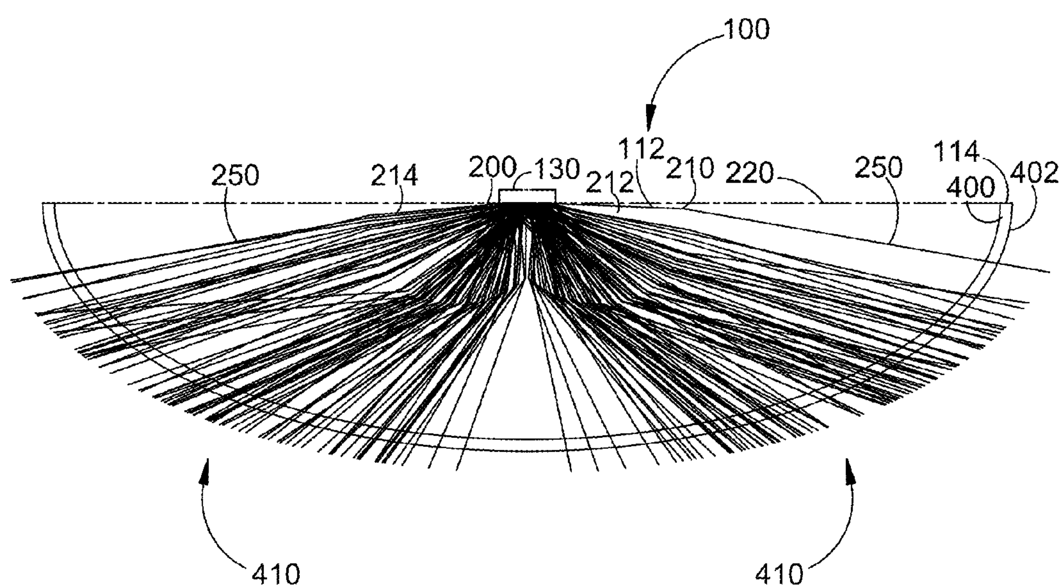
FIG. 12 illustrates an example of a distribution pattern of rays emitted across the emission surface of the LED.

As discussed above, the ray pattern illustrated in FIG. 11 is based on emission of light from a point source at the center of the emission surface 134 of the LED 130. In a physical embodiment, light is emitted from the entire active surface area of the LED. Thus, the light rays are not all emitted from the center point 202 of the primary optical lens 112. Accordingly, not all light rays cross the air-glass boundary at the inner surface 200 without refraction. Many rays are refracted at the inner surface and are thus incident to the glass-air boundary at the outer surface 210 at angles other than the angles illustrated in FIG. 11. For example, FIG. 12 illustrates an example of a distribution pattern of rays emitted across the emission surface of the LED. In FIG. 12, the rays are again concentrated in a range of angles between about 15 degrees from the normal to about 40 degrees from the normal with relatively fewer rays in the range from the normal to about 15 degrees. One of the purposes of the optical lens is to reduce the concentration of the light about the normal so as to avoid illumination "hotspots" directly below the lens. Thus, the presence of light rays proximate to the normal is acceptable as long as the concentration is reduced as shown.

As further shown in FIGS. 11 and 12, the rays emanating from the outer surface 210 of the optical lens 112 are incident on an inner surface 400 of the diffuser lens 114. In one embodiment, the diffuser lens has the general shape of a circular arc or elliptical arc positioned with respect to the center point 202 of the optical lens. For example, the distance from the center of the optical lens to the inner surface of the diffuser lens along the normal 136 is approximately 1 inch (approximately 25 millimeters); and the distance from the center point to the inner surface along the horizontal reference line 220 is approximately 2 inches (approximately 51 millimeters). In one embodiment, the diffuser lens has a thickness of approximately 0.04 inch (approximately 1 millimeter) from the inner surface to an outer surface 402. The diffuser lens may comprise a transparent thermoplastic such as, for example, polycarbonate (PC) or polymethyl methacrylate (PMMA) formed into the illustrated shape with a diffusion pattern formed into the thermoplastic material. For example, in one embodiment, the diffusion pattern is a holographic diffusion pattern. Other diffusion patterns may also be used. The diffuser lens spreads the light in a pseudorandom manner illustrated by a plurality of rays 410 to provide a generally uniform luminance on the outer surface of the diffuser lens.

Figure 13:
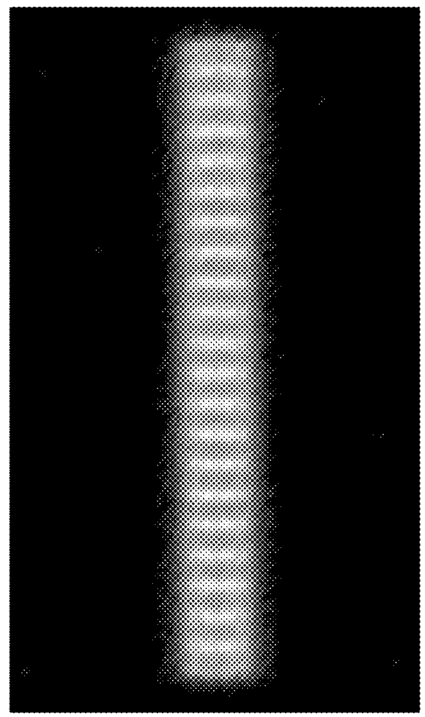
FIG. 13 is a bottom plan view of the lighting apparatus of FIGS. 1-6 showing the effect of the primary optical lens on the light generated by the linear array of LEDs without being diffused by the diffuser lens.
Figure 14:
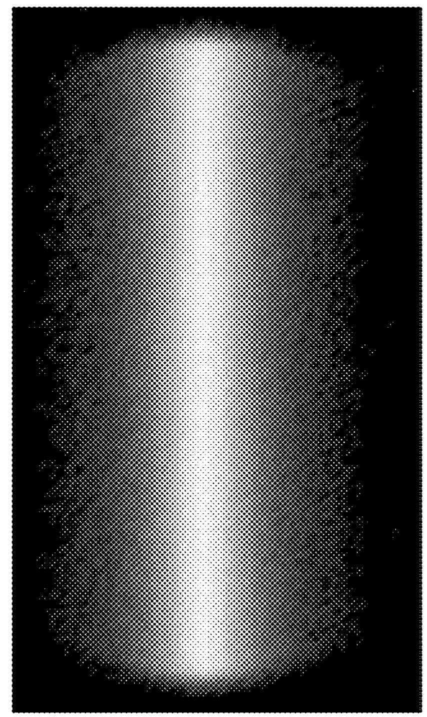
FIG. 14 illustrates the bottom plan view of the lighting apparatus of FIGS. 1-6 similar to the view of FIG. 13, but with the primary optical lens removed and a diffuser lens positioned proximate to the linear array of LEDs.
Figure 15:
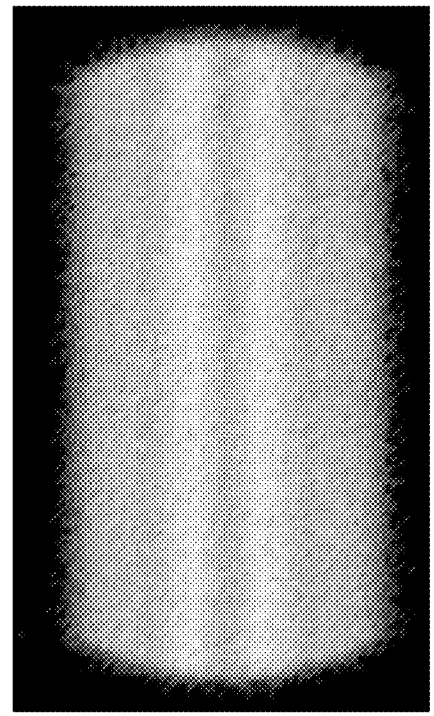
FIG. 15 illustrates the bottom plan view of the lighting apparatus of FIGS. 1-6 similar to the view of FIG. 13 but with the diffuser lens positioned proximate to the primary optical lens to show the light more uniformly distributed over the outer surface of the diffuser lens.

The combined effect of the optical lens 112 and the diffuser lens 114 on the light generated by the LEDs 130 is illustrated in the plan views of FIGS. 13-15, which represent the intensity of light when viewed perpendicular to the emission surfaces 134 of the LEDs for a section of the linear array of LEDs having a length of approximately 8 inches. In FIG. 13, the diffuser lens is removed to show the effect of the primary optical lens alone in distributing the light from the LEDs. The image shows the light emerging from the outer surface 210 of the optical lens is concentrated along the outer edges of the optical lens away from the normals to the LEDs. In FIG. 14, only the diffuser is positioned over the LEDs without the intervening primary optical lens. In FIG. 14, the light is concentrated over the normals to the LED emission surfaces as expected because of the Lambertian distribution of light shown in FIG. 7. In contrast, in FIG. 15, the primary optical lens and the diffuser lens are both included, and the light is more uniformly distributed over the outer surface 310 of the diffuser lens. The image in FIG. 15 continues to show the effect of the primary optical lens in reducing the intensity of the light along the normals to the LEDs.

Figure 16:
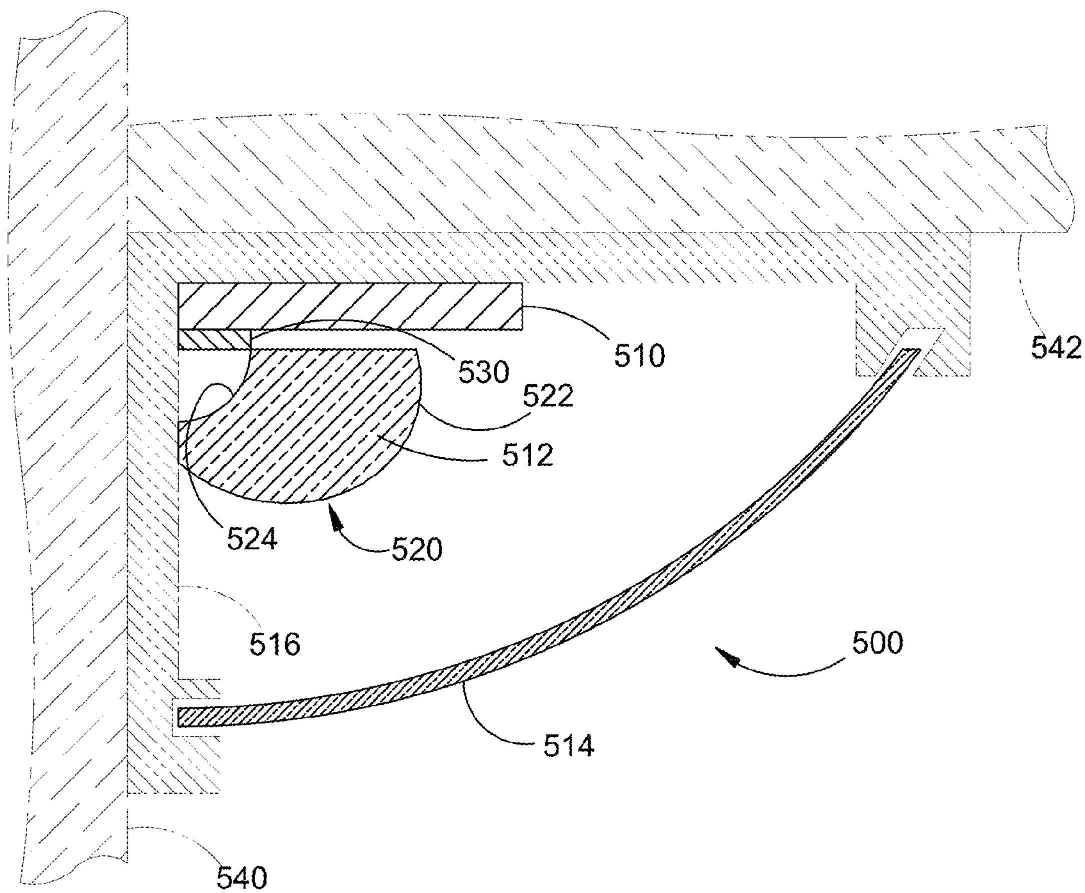
FIG. 16 illustrates a version the lighting apparatus in which the primary optical lens has a single lobe.

The lighting assembly 100 in accordance with the foregoing embodiment includes a primary optical lens 112 with two identical lobes 212 and 214. An alternative lighting assembly 500 illustrated in a cross-sectional view in FIG. 16 comprises a base module 510, a primary optical lens 512 and a diffuser lens 514. The base module and the diffuser lens are mounted to a mounting frame 516 (shown in phantom). Basically, the embodiment of FIG. 16 corresponds to the embodiment of FIG. 5 with the left half removed. For example, the primary optical lens comprises only a single lobe 520 having an inner surface 522 and an outer surface 524. The inner surface of the primary optical lens is positioned over a linear array of LEDs (represented in the cross-sectional view by an LED) 530 as before except that the LED is not centered with respect to the inner surface. The alternative lighting assembly of FIG. 16 is suitable for providing lighting from corner locations such as, for example, an upper corner at the intersection of a wall 540 and a ceiling 542, both of which are represented by respective phantom lines.

As discussed above, the primary optical lens 112 can be formed by replacing the facets 160*a*-160*y* on the outer surface 210 with a continual spline. Such an alternative embodiment is illustrated by a first (right) lobe 602 of a lens 600 in FIG. 17 having an inner surface 604 and an outer surface 610. In FIG. 17, the outer surface is formed by a spline that smoothly interconnects intersections of the ending point of facets with the starting points of adjacent facets. The intersections can be considered as the reference points for a spline 600 to form a continually varying curve from a starting point 612 (corresponding to the starting point of the first facet 160*a* in FIG. 9) to an ending point 614 (corresponding to the ending point of the 25$^{th}$ facet 160*y* in FIG. 10). Such a spline also causes the lens to have a varying thickness with a first portion 620 of the lens having an increasing thickness as the radii to the reference points of the spline increase and with a second portion 622 of the lens having a decreasing thickness as the radii to the reference points of the spline decrease. It can be seen the profile of the outer surface in FIG. 17 again comprises a plurality of interconnected points with each adjacent pair of the plurality of interconnected points interconnected by a portion of the spline such that the outer surface comprises a smooth curve with continually varying distances from the center point 202 (FIG. 8) of the lens.

FIGS. 18-22 illustrate a further embodiment of a lighting apparatus 700 comprising a diffuser lens 702 and a primary optical lens 710. The diffuser lens (shown in FIG. 18 only) has the general shape of a hollow spherical cap. The diffuser lens has the shape of a part of a hollow sphere, but comprises less than half of the sphere defined by the radius forming the diffuser lens. The mechanical hardware interconnecting the diffuser lens and the other components are not shown in FIGS. 18-22.

As shown in FIGS. 18, 19, 21 and 22, the primary optical lens 710 has a cross-sectional profile corresponding to the cross-sectional profile of the previously described embodiment. As shown in the upper perspective view of FIG. 19 and the lower perspective view of FIG. 20, the primary optical lens is rotationally symmetrical about a vertical axis (lens optical axis) 712. As shown in FIG. 19 and FIG. 22, a hemispherical input surface 720 is positioned to receive light from an LED 732, which is supported by an LED module 730. A lower perspective view of the LED module is shown in FIG. 19. In the illustrated embodiment, the LED module is a LUGA Shop 2013, which is commercially available from Vossloh-Schwabe Deutschland GmbH of Lüdenscheid, Germany. The LED on the module is generally round and has an overall diameter of an emission surface 734 of approximately 1.12 inch (approximately 28.5 millimeters). When the LED module is positioned as shown in FIG. 19, the center of the emission surface is aligned with the center of the hemispherical input surface of the lens as shown in the cross-sectional view of FIG. 22.

As shown in the cross-sectional view of FIG. 22, the primary optical lens 710 comprises the semicircular inner surface 720 and an outer surface 740, wherein the thickness of the lens between the inner surface and the outer surface varies in accordance with the angular position of a lens portion with respect to a horizontal reference line 742. The outer surface of the embodiment in FIGS. 18-22 has a plurality of facets 744 corresponding to the facets 160*a*-160*y* shown in FIGS. 9 and 10; however, the outer surface can also be formed as a smooth spline corresponding to the embodiment of FIG. 17. Unlike the previously described embodiment in which the profile of the lens extends linearly to form a generally cylindrical lens that covers the array of LEDs, the lens of FIGS. 18-22 is rotated about the vertical axis 712 to form a rotationally symmetric lens that is positioned below the single LED 732 when oriented as shown in FIGS. 19 and 22. It should be appreciated that the embodiment of FIGS. 18-22 has a light distribution similar to the light distribution shown in FIG. 11 except that the light distribution will be rotationally symmetrical about the vertical axis rather than being extended linearly. It should be understood that the rotationally symmetrical lens of FIGS. 18-22 can be produced by rotating the two lobes of the lens profile through an angle of 180 degrees about the vertical axis or by rotating a single lobe of the lens profile through an angle of 360 degrees about the vertical axis.

Figure 23:
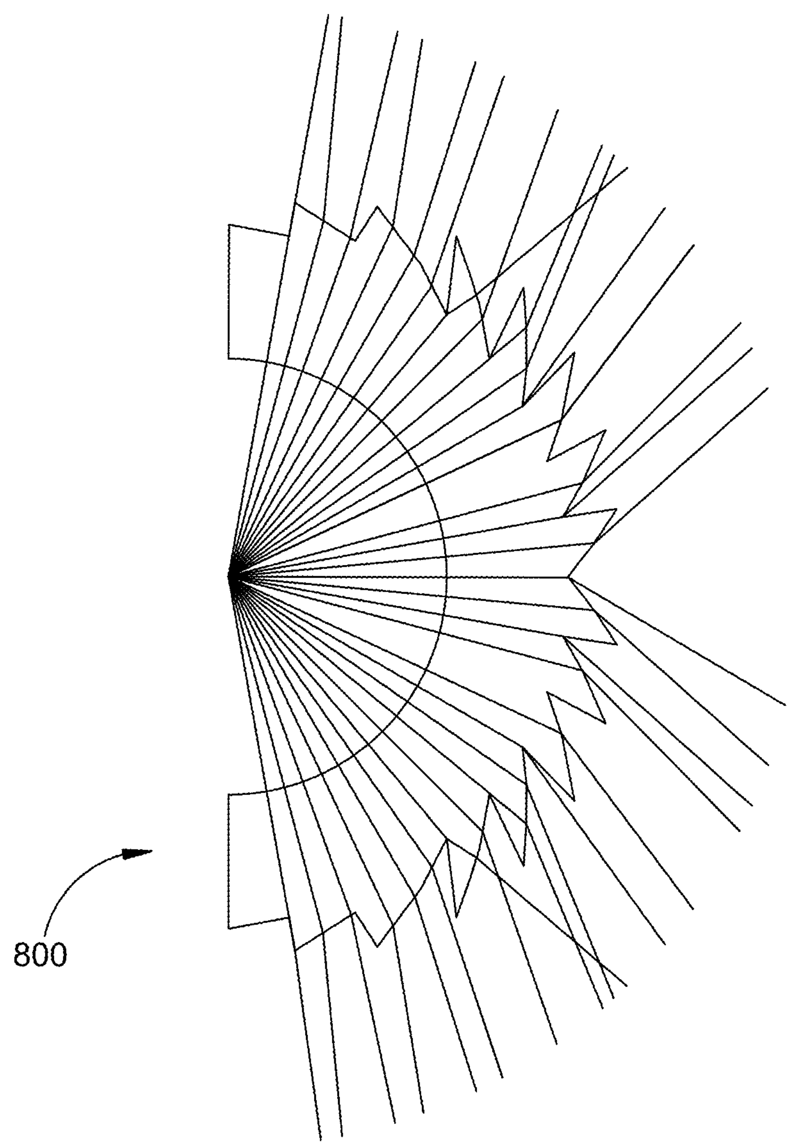
FIG. 23 illustrates a cross-sectional view of an alternative embodiment in which selected curve segments are moved closer to the center point of the lens to form Fresnel facets having similar refraction properties to the lens shown in FIG. 8.

FIG. 23 illustrates a cross-sectional view of an alternative embodiment of a primary optical lens 800 in which selected groups of curve segments are moved closer to the center point of the lens to form a Fresnel facets having similar refraction properties to the lens shown in FIG. 8. The lens in FIG. 23 is more compact than the lens in FIG. 8. The angles of the facets in FIG. 8 are configured similarly to the facets described above such that the refractions provided by the curve segments will produce the previously described refractions. Because the Fresnel facets overlap in the compact lens in FIG. 23, some of the rays will be refracted by more than one curve segment resulting in further dispersion of the rays. Although not shown in FIG. 23, a small portion of the rays may undergo total internal reflection in combination with refraction to further disperse the rays.

One skilled in art will appreciate that the foregoing embodiments are illustrative of the present invention. The present invention can be advantageously incorporated into alternative embodiments while remaining within the spirit and scope of the present invention, as defined by the appended claims.

What is claimed is:

1. A low-profile lighting apparatus, the lighting apparatus comprising:

at least one light-emitting diode (LED);

a primary optical lens positioned with respect to the LED, the primary optical lens comprising at least one lobe defined with respect to a lens reference plane, with respect to a lens center point in the lens reference plane, and with respect to a lens optical axis orthogonal to the lens reference plane and passing through the lens center point, the at least one lobe comprising:

a primary lens input surface displaced from the lens center point to receive light emitted by the LED, the primary lens input surface having a semicircular profile defined with respect to the lens center point; and a primary lens output surface displaced from the primary lens input surface to define a primary lens body between the input surface and the output surface, the primary lens output surface having a cross-sectional profile defined with respect to the lens reference plane and the lens optical axis, the cross-sectional profile of the output surface comprising:

at least a first curve segment angularly closest to the lens reference line, the first curve segment having a first slope that slopes away from the lens reference line and away from the lens optical axis;

at least a second curve segment which is angularly farther from the lens reference line than the first curve segment, the second curve segment having a second slope that slopes away from the lens reference line, the second slope steeper than the first slope;

at least a third curve segment which is angularly farther from the lens reference line than the second curve segment, the third curve segment having a third slope that is less steep than the second slope, the third curve segment having a third slope that slopes away from the lens reference line and toward the lens optical axis;

a first plurality of additional curve segments which are progressively angularly farther from the lens reference line than the third curve segment, each of the first plurality of additional curve segments sloping away from the lens reference line and sloping toward the lens optical axis, with each successive curve segment having a slope that is less steep than the immediately preceding curve segment;

a second plurality of additional curve segments which are progressively angularly farther from the lens reference line than the first plurality of additional curve segments, the second plurality of additional line segments sloping toward the lens reference line and sloping towards the lens optical axis, with each successive curve segment in the second plurality of additional curve segments having a steeper slope than the immediately preceding curve segment.

2. The low-profile lighting apparatus as defined in claim 1, wherein the cross-sectional profile of the output surface further comprises a third plurality of additional curve segments which are progressively angularly farther from the lens reference line than the second plurality of additional curve segments, the third plurality of additional curve segments sloping toward the lens reference line and sloping towards the lens optical axis with each successive curve segment in the third plurality of additional curve segments having a less steep slope than the immediately preceding curve segment.

3. The low-profile lighting apparatus as defined in claim 1, wherein each curve segment is substantially straight.

4. The low-profile lighting apparatus as defined in claim 3, wherein the curve segments have the appearance of an arcuate segment of a faceted Archimedean spiral.

5. The low-profile lighting apparatus as defined in claim 4, wherein the curve segments have the appearance of an arcuate segment of a faceted involute curve.

6. The low-profile lighting apparatus as defined in claim 1, wherein each curve segment is an arcuate segment of a spline curve.

7. The low-profile lighting apparatus as defined in claim 6, wherein the spline curve has the appearance of an arcuate segment of an Archimedean spiral.

8. The low-profile lighting apparatus as defined in claim 6, wherein the spline curve has the appearance of an arcuate segment of an involute curve.

9. The low-profile lighting apparatus as defined in claim 1, wherein the at least one lobe is a first lobe, and wherein the primary optical lens further comprises a second lobe, the second lobe having a cross-sectional profile symmetrical with the cross-sectional profile of the first lobe about the lens optical axis, the first and second lobes extending along a longitudinal axis.

10. The low-profile lighting apparatus as defined in claim 9, wherein the symmetrical profiles of the outer surfaces of the two lobes have a "batwing" appearance.

11. The low-profile lighting apparatus as defined in claim 1, wherein the at least one lobe is rotated about the lens optical axis such that the primary optical lens is rotationally symmetric about the lens optical axis.

12. The low-profile lighting apparatus as defined in claim 1, wherein the curve segments are grouped in a plurality of Fresnel facets to reduce the overall thickness of the primary optical lens.

13. A low-profile lighting apparatus, the lighting apparatus comprising:

at least one light-emitting diode (LED);

a primary optical lens positioned with respect to the LED, the primary optical lens comprising at least one lobe defined with respect to a lens reference plane, with respect to a lens center point in the lens reference plane, and with respect to a lens optical axis orthogonal to the lens reference plane and passing through the lens center point, the at least one lobe comprising:

a primary lens input surface displaced from the lens center point to receive light emitted by the LED, the primary lens input surface having a semicircular profile defined with respect to the lens center point; and a primary lens output surface displaced from the primary lens input surface to define a primary lens body between the input surface and the output surface, the primary lens output surface having a cross-sectional profile defined with respect to the lens reference plane and the lens optical axis, the cross-sectional profile of the output surface comprising a plurality of interconnected points positioned angularly with respect to the lens reference plane and spaced apart from the center point by distances that vary in accordance with the angular positions of the points with respect to the lens reference plane, wherein:

a first point is located at a first angular position with respect to the lens reference plane and is located a first linear distance from the center point;

at least a second point is located at a second angular position with respect to the lens reference plane, the second angular position greater than the first angular position, and is located at a second linear distance from the center point, the second linear distance greater than the first linear distance;

at least a third point is located at a third angular position with respect to the lens reference plane, the third angular position greater than the second angular position, and is located at a third linear distance from the center point, the third linear distance less than the second linear distance;

a last point is located on the lens optical axis and is located a shortest linear distance from the center point, the shortest linear distance less than the third linear distance; and any points between the third point and the last point are located at increasing angular distances from the lens reference plane and are located at decreasing linear distances from the center point.

14. The low-profile lighting apparatus as defined in claim 13, wherein:

the at least one LED comprises a plurality of light-emitting diodes (LEDs) arranged in a linear array along a longitudinal array axis; and the profile of the input surface and the profile of the output surface of the primary optical lens extend longitudinally along the longitudinal array axis to position the input surface over the LEDs in the linear array.

15. The low-profile lighting apparatus as defined in claim 14, wherein:

the primary optical lens extends longitudinally along a lens axis:

the body of the primary optical lens between the lens reference plane and the lens optical axis comprises a first lobe positioned on a first side of the lens optical axis; and the body of the primary optical lens further includes a second lobe positioned on a second side of the lens optical axis, the second lobe and the first lobe being symmetrical with respect to the lens optical axis.

16. The low-profile lighting apparatus as defined in claim 15, wherein the profile of the first lobe and the profile of the second lobe together have a batwing-like shape.

17. The low-profile lighting apparatus as defined in claim 14, wherein:

the lens reference plane extends longitudinally in parallel with the longitudinal array axis;

the lens optical axis lies in a second reference plane orthogonal to the lens reference plane, the second reference plane extending longitudinally along the longitudinal array axis; and light emitted by the LEDs enters the at least one lobe of the primary optical lens via the input surface and is refracted from the outer surface at a plurality of angles between the lens reference plane and the second reference plane such that the light is concentrated at angles in a range of approximately 15 degrees from the second reference plane to approximately 40 degrees from the second reference plane.

18. The low-profile lighting apparatus as defined in claim 13, wherein the profile of the outer surface of the primary optical lens has an appearance similar to a portion of an Archimedean curve.

19. The low-profile lighting apparatus as defined in claim 14, wherein the profile of the outer surface of the primary optical lens has an appearance similar to a portion of an involute curve.

20. The low-profile lighting apparatus as defined in claim 14, wherein:

the at least one LED comprises a single LED having an emission surface positioned close to the center point of the primary optical lens; and the profile of the input surface and the profile of the output surface of the primary optical lens are rotated about the lens optical axis to form a rotationally symmetric lens body about the lens optical axis.

21. The low-profile lighting apparatus as defined in claim 20, wherein:

light emitted by the LED enters the primary optical lens via the input surface and is refracted from the outer surface at a plurality of angles between the lens reference plane and the lens optical axis, such that the light is concentrated at angles in a range of approximately 15 degrees from the second reference line to approximately 40 degrees from the lens optical axis, the light being concentrated rotationally symmetrically about the lens optical axis.

22. The low-profile lighting apparatus as defined in claim 14, wherein the plurality of interconnected points are interconnected by a spline curve to provide a smooth outer surface of the primary optical lens having a continually varying distance from the center point.

23. The low-profile lighting apparatus as defined in claim 14, wherein the points in each adjacent pair of the plurality of interconnected points are interconnected by a facet.

24. The low-profile lighting apparatus as defined in claim 14, further comprising a diffuser lens displaced from the primary optical lens to receive light from the output surface of the primary optical lens and to diffuse the received light.

25. A low-profile lighting apparatus, the lighting apparatus comprising:

at least one light-emitting diode (LED);

a primary optical lens positioned with respect to the LED, the primary optical lens having at least one lobe between a lens reference plane and a lens optical axis, the lens optical axis passing through a lens center point lying in the lens reference plane, the at least one lobe comprising:

a primary lens input surface displaced from the lens center point to receive light emitted by the LED, the primary lens input surface having a semicircular profile defined with respect to the lens center point; and a primary lens output surface displaced from the primary lens input surface to define a primary lens body between the input surface and the output surface, the primary lens output surface having a cross-sectional profile defined by a plurality of interconnected points to provide a continuous outer surface, wherein the interconnected points are displaced from the lens center point by varying distances and are positioned at varying angles with respect to the lens reference plane, the interconnected points comprising a first set of points along a first portion of the output surface from the lens reference plane to a first boundary angle wherein the points are positioned at increasing distance from the lens center point as the angles with respect to the lens referenced plane increase, the interconnected points comprising a second set of points along a second portion of the output surface from the boundary angle to the lens optical axis wherein the points are positioned at decreasing distances from the lens center point as the angles with respect to the lens referenced plane increase.

26. The low-profile lighting apparatus as defined in claim 25, wherein the at least one lobe is a first lobe, and wherein the primary optical lens further comprises a second lobe, the second lobe having a cross-sectional profile symmetrical with the cross-sectional profile of the first lobe about the lens optical axis, the first and second lobes extending along a longitudinal axis.

27. The low-profile lighting apparatus as defined in claim 25, wherein the at least one lobe is rotated about the lens optical axis such that the primary optical lens is rotationally symmetric about the lens optical axis.

28. The low-profile lighting apparatus as defined in claim 25, wherein the plurality of interconnected points are interconnected by a spline curve to provide a smooth outer surface of the primary optical lens having a continually varying distance from the center point.

29. The low-profile lighting apparatus as defined in claim 25, wherein the points in each adjacent pair of the plurality of interconnected points are interconnected by a facet.

30. The low-profile lighting apparatus as defined in claim 25, wherein the profile of the outer surface of the primary optical lens has an appearance similar to a portion of an Archimedean curve.

31. The low-profile lighting apparatus as defined in claim 25, wherein the profile of the outer surface of the primary optical lens has an appearance similar to a portion of an involute curve.

* * * * *